UNITED STATES PATENT OFFICE.

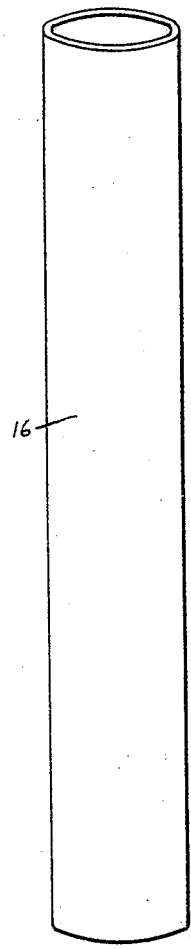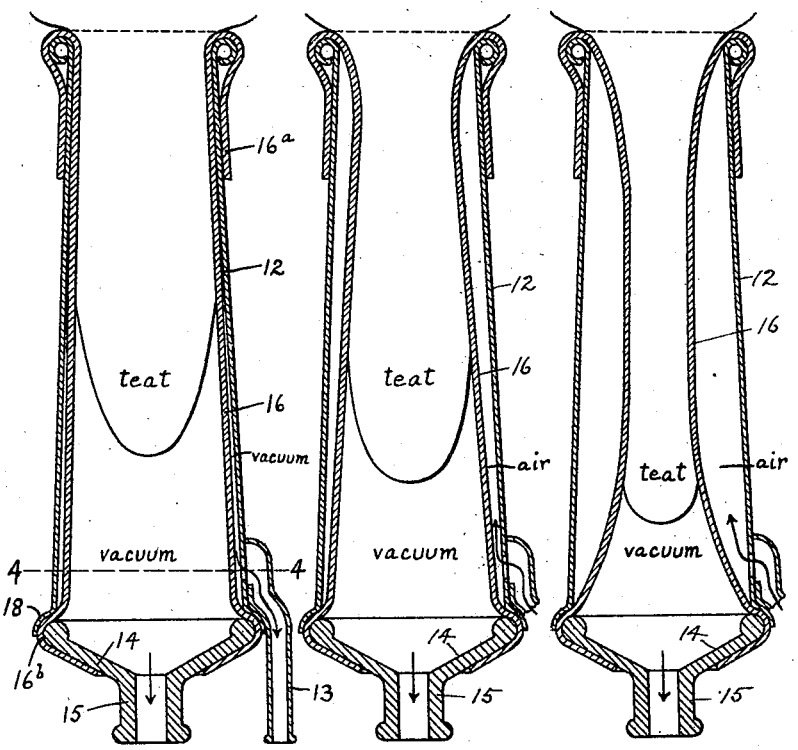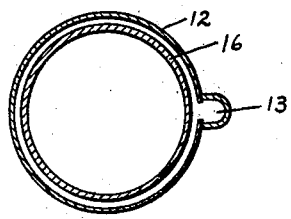

MERRITT C. BARDEN, OF WEST PAWLET, VERMONT.

TEAT CUP.

1,412,158.                    Specification of Letters Patent.    Patented Apr. 11, 1922.

Application filed February 28, 1921. Serial No. 448,637.

*To all whom it may concern:*

Be it known that I, MERRITT C. BARDEN, a citizen of the United States, residing at West Pawlet, in the county of Rutland and State of Vermont, have invented new and useful Improvements in Teat Cups, of which the following is a specification.

The chief object of this invention is to provide a teat cup of improved construction, operable by air under atmospheric pressure and by vacuum, in such manner as to desirably massage a teat inserted in the cup and contract the same by a gentle progressive action, the contraction commencing at or near the base of the teat and progressing downward.

Another object is to enable the parts of the cup to be readily separated and cleaned, and conveniently reassembled for operation.

To these and other related ends, the invention consists in the improvements hereinafter described and claimed.

Of the accompanying drawings forming a part of this specification,—

Figures 1, 2 and 3 are longitudinal sections of a teat cup embodying the invention, illustrating the different stages of the operation.

Figure 4 is a section on line 4—4 of Figure 1.

Figure 5 is a perspective view, showing the elastic inner tube hereinafter described, in its normal form.

The same reference characters indicate the same parts in all of the figures.

In the drawings, 12 represents a tapered rigid outer tube, preferably of sheet metal, the tube being of suitable diameter at its upper end, to surround the inner tube hereinafter described, and a teat inserted in the inner tube, and gradually increasing in diameter downward, so that its lower end is considerably larger than its upper end.

The outer tube is provided between its ends, and preferably near its lower end, with an air and vacuum nipple 13, adapted for connection by a flexible tube with the pulsator of a milking machine. 14 represents an annular head provided with a vacuum nipple 15, adapted for connection by a flexible tube with a milk receptacle in which vacuum is maintained, said head forming the lower end of a vacuum space in the cup below the teat. 16 represents an elastic teat-receiving inner tube, normally of uniform diameter from end to end, the normal diameter being less than that of the larger end of the outer tube.

The inner tube is longitudinally stretched within the outer tube 12, and is at the same time distended at its lower end portion, so that it conforms approximately to the outer tube, the end portions of the inner tube being suitably secured to the end portions of the outer tube and the head 14, to maintain the longitudinal stretch and the partial distension of the inner tube, and permit the separation of its intermediate portion from the outer tube, the distension of the inner tube decreasing, so that its upper end portion is not distended within the outer tube. The tapering form and decreasing distension thus imparted to the inner tube, involves a decrease from the larger to the smaller end, of the tautness of the tube wall, and of its resistance to force tending to collapse the same. In other words, the distension of the inner tube wall and its resistance to collapsing force progressively decreases from its lower to its upper end, so that a pulsation of air admitted from a pulsator between the inner and the outer tube, cooperates with vacuum maintained in the inner tube below the inserted teat, to progressively collapse the inner tube upon the teat, the collapse commencing at the upper portion of the inner tube, as shown by Figure 2, and progressing downwardly therefrom, as indicated by Figure 3. The teat is thus gently massaged in such manner that milk is discharged without causing soreness of the teat.

It will be understood that the operation of the pulsator element of the milking machine, of which the teat cup forms an element, alternately exhausts air from the annular space between the outer and inner tubes, leaving the inner tube in the condition shown by Figure 1, and admits air under atmospheric pressure to said space, as indicated by Figures 2 and 3, vacuum being maintained in the inner tube.

The outer and inner tubes and the vacuum nipple head are preferably separably connected, so that they may be conveniently cleansed, and the effort of the stretched inner tube to contract lengthwise is preferably utilized to hold the head 14 in its operative position.

In the preferred construction here shown, the outer tube is provided at its lower end with a cupped flange 18, forming a downwardly facing seat surrounding the tapering body of the tube, and of greater diameter than the lower end of said body. The upper end portion of the inner tube is extended from the outer tube and turned outward over the beaded upper end of the outer tube, and downward over a portion of the periphery thereof, the downwardly turned portion 16ª being automatically contracted on the outer tube. The upper end of the inner tube is thus securely engaged with the outer tube.

The margin of the head 14, which is of greater diameter than the lower end of the outer tube, is inserted in the lower end portion of the inner tube, and distends a zone 16ᵇ of said portion, so that the lower end of the inner tube is securely engaged with the head. The effort of the inner tube, (now longitudinally stretched and securely engaged with the upper end of the outer tube), to contract lengthwise, draws the head 14 toward the seat 18, and causes the zone 16ᵇ to bear as a packing on the seat.

In assembling the parts, the inner tube is first stretched over the head 14, and then pushed through the outer tube. The projecting upper end of the inner tube is then pulled upward to stretch the inner tube and draw the head 14 to its operative position relatively to the seat 18. The upper end portion of the inner tube is then turned outward over the upper end of the outer tube, and downward over a portion of the periphery of the latter. Air tight joints are thus formed at both ends of the cup.

A milking machine or apparatus which includes teat cups embodying my invention, is operable by a relatively low vacuum, the degree of vacuum and the power required to produce the same being lower than would be required if the inner tube were not progressively collapsed downwardly in the manner described. The action of the cup is to simultaneously draw and force milk from the teat, and this is effected by a relatively small expenditure of power.

I claim:

1. A teat cup comprising a tapered rigid outer tube, larger at its lower than at its upper end, and tapering continuously from end to end, and having an air and vacuum nipple between its ends, adapted for connection with a pulsator; a head at the lower end of the tube, provided with a vacuum nipple, adapted for connection with a milk receptacle in which vacuum is maintained; and an elastic teat-receiving inner tube, normally of uniform diameter, which is smaller than the diameter of the larger end of the outer tube, the inner tube being longitudinally stretched within the outer tube, and distended decreasingly from its lower end portion to its upper end portion, so that it has a continuous taper conforming approximately to the tapering form of the outer tube, whereby the distension of the inner tube, and its resistance to collapsing force progressively decreases from its lower to its upper end, the construction and arrangement being such that a pulsation of air admitted between the inner and outer tubes cooperates with vacuum maintained in the inner tube upon a teat inserted therein, to progressively collapse the inner tube upon the teat, from the base to the end of the latter, the collapse commencing at the upper portion of the inner tube and the base portion of the teat, and progressing downwardly therefrom to the end of the teat.

2. A teat cup comprising a tapered rigid outer tube, larger at its lower than at its upper end, and provided with a seat surrounding its lower end, and of greater diameter than the latter, and with a nipple above said seat, adapted for connection with a pulsator; an annular head formed to be supported by said seat, said head having a vacuum nipple adapted for connection with a milk receptacle in which vacuum is maintained; and an elastic teat-receiving inner tube, normally of smaller diameter than the larger end of the outer tube, and distended at one end portion by the annular head, the inner tube being detachably secured to, and distended by said head and secured both to the head and to the upper end of the outer tube by its contractile force, and longitudinally stretched so that its effort to contract lengthwise confines the vacuum nipple head in its operative position relatively to said seat; the inner tube being tapered to correspond approximately to the ends of the outer tube, so that the distension of the inner tube, and its resistance to collapsing force, progressively decreases from its lower to its upper end.

In testimony whereof I have affixed my signature.

MERRITT C. BARDEN.